United States Patent [19]

O'Dell et al.

[11] Patent Number: 5,275,876
[45] Date of Patent: Jan. 4, 1994

[54] STATIC DISSIPATIVE LAMINATE CONTAINING AN INTERIOR SPECIAL CORE LAYER CONTAINING CARBON FIBERS

[75] Inventors: Robin D. O'Dell, Pasadena; Christine C. Wyche; Israel S. Ungar, both of Randallstown, all of Md.

[73] Assignee: Nevamar Corporation, Odenton, Md.

[21] Appl. No.: 970,228

[22] Filed: Nov. 2, 1992

Related U.S. Application Data

[63] Continuation of Ser. No. 624,442, Dec. 10, 1990, abandoned.

[51] Int. Cl.⁵ .................... B32B 5/06; D21F 11/00; D21H 11/00
[52] U.S. Cl. .................... 428/293; 162/123; 162/125; 162/129; 162/132; 162/138; 162/141; 162/188; 428/297; 428/298; 428/302; 428/303; 428/924; 428/931
[58] Field of Search ............... 428/408, 326, 328, 329, 428/297, 298, 284, 282, 280, 293, 302, 303, 924, 931; 162/123, 125, 129, 132, 138, 141, 188

[56] References Cited

U.S. PATENT DOCUMENTS

| 4,540,624 | 9/1985 | Cannady, Jr. | 428/408 |
| 4,724,187 | 2/1988 | Ungar et al. | 428/408 |
| 4,784,908 | 11/1988 | Ungar et al. | 428/408 |

*Primary Examiner*—George F. Lesmes
*Assistant Examiner*—James D. Withers
*Attorney, Agent, or Firm*—Sheridan Neimark

[57] ABSTRACT

A static dissipative laminate consistently having an internal resistance less than $2 \times 10^6$ and a resistance to ground measurement of about $5 \times 10^6$ and a surface resistance in the static dissipative range even at a very low humidities is produced by the use of an ionic salt and an humectant in the overlay and further by the use of a special top core sheet containing 0.6-1.0% by weight of carbon fibers.

15 Claims, 1 Drawing Sheet

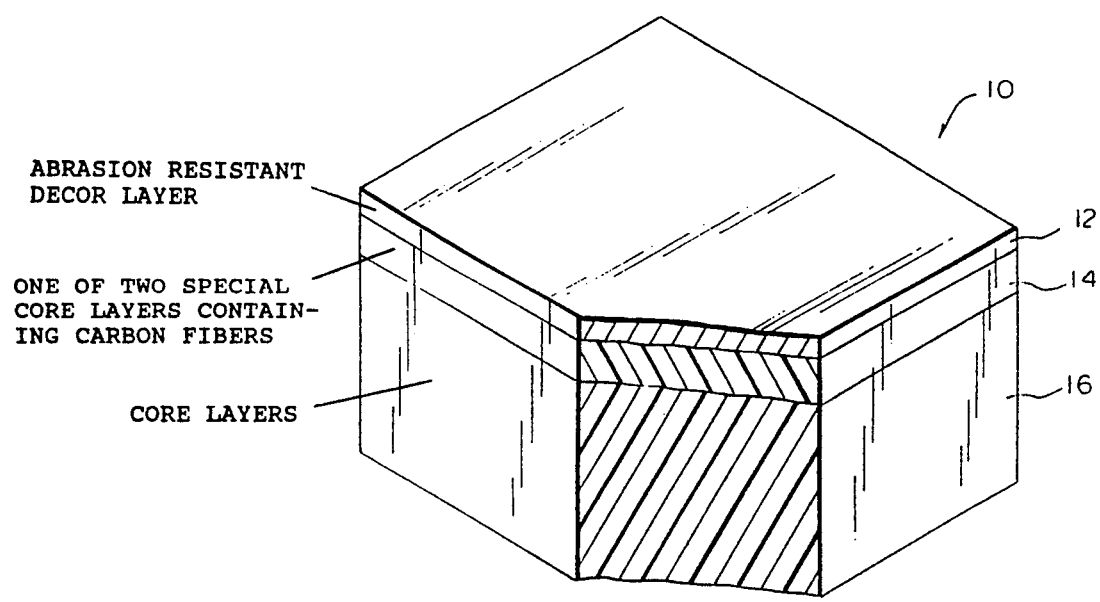

STATIC DISSIPATIVE LAMINATE CONTAINING AN INTERIOR SPECIAL CORE LAYER CONTAINING CARBON FIBERS

This application is a continuation of U.S. patent application Ser. No. 07/624,442 filed Dec. 10, 1990, now abandoned.

FIELD OF THE INVENTION

The present invention relates to static dissipative laminates and, more particularly, to a static dissipative laminate having one or more layers containing sheets of carbon fiber paper below a decor layer.

BACKGROUND OF THE INVENTION

Considerable interest exists for static dissipative and electrically conductive laminates for use in various environments, including static dissipative work surfaces and conductive flooring materials. Among the prior patents there may be mentioned are the patents to Wilks et al U.S. Pat. No. 3,922,383; Cannady et al U.S. Pat. No. 4,480,001; Cannady U.S. Pat. No. 4,540,624; Berbeco U.S. Pat. No. 4,454,199 and Berbeco U.S. Pat. No. 4,455,350. The use of carbon black filled paper is known, as is the use of salts, noting patents such as Meiser U.S. Pat. No. 3,650,821 and Economy et al U.S. Pat. No. 3,567,689. However, no one product is suitable for all static dissipative and conductive environments, because different usages, i.e. environments, require different properties.

Grosheim et al U.S. Pat. No. 4,472,474 belongs to the prior art mentioned above, but is of further interest in disclosing the use of an electrically conductive fibrous web in order to impart greater conductivity to the laminate, this conductive web being preferably highly loaded with conductive particles. As a non-preferred alternative, conductive fibers can be used. Example 5 specifically mentions the use of carbon fiber-containing conductive webs of 90% and 40% carbon fibers.

Cannady U.S. Pat. No. 4,540,624 discloses anti-static laminates containing long carbon fibers, these carbon fibers being uniformly distributed throughout at least the to decorative sheet of the laminate.

Prior static dissipative laminates suffered from certain disadvantages in addition to being either too conductive or not conductive enough. Thus, some of these static dissipative laminates have an upper surface containing carbon particles for providing a conductive path from the upper surface of the laminate to the interior. This can result in dusting of conductive material from the surface of the laminate as it wears, which conductive material by itself will result in damage due to electrical short circuits. In addition, the color of these laminates is limited to black, which can provide human engineering problems.

Another problem which occurs with such prior static dissipative laminates is that the surface of the laminate tends to lose its electrical conductivity when the relative humidity drops in winter time. Measured resistivity of conventional static dissipative and conductive laminates is strongly dependent on relative humidity, and can change several orders of magnitude between 50% relative humidity and 15% relative humidity. Prior art static dissipative and conductive laminates do not perform well at relative humidities below 25–30%. For this reason, work areas may have to be humidified, which is not always desirable due to the possibility of inducing corrosion in certain products and in certain equipment as well. In addition, the necessity for precise humidification increases the cost of handling the electronic components.

Two of the high pressure decorative laminates having static dissipating or conducting properties use a highly conductive impregnated layer below the decor sheet. Of these, one has an excessive surface resistivity and it appears that the upper layer is not sufficiently conductive. The other uses quarternary ammonium compounds in the upper layer, along with the conductive carbon containing paper therebelow, and while this laminate is adequate at normal relative humidity (about 50%), it is inadequate at low relative humidities. A third product of yet another manufacturer, although somewhat better, is still inadequate at low relative humidities.

Prior art static dissipative laminate has also introduced the problem of field suppression. This occurs when the laminate is constructed of a highly conductive layer buried under a relatively non-conducting surface. When a charged object is placed on the laminate surface, a field is induced in the buried conductive layer forming what is, in effect, a leaky capacitor. The overall result is that to an outside observer, e.g. a static electricity sensing meter such as an electrometer, a zero electrical potential exists when, in reality, the field is hidden within the laminate. When an object such as an electronic component is lifted from the laminate surface, the charge reappears thereby creating the static electricity hazard sought to be avoided.

An excellent static dissipative laminate, described in Ungar et al U.S. Pat. No. 4,784,908, which laminate has served the industry well, uses a carbon particle filled paper two layers down from the surface decorative laminate. One of the advantages of this static dissipative laminate is that it has a zero volt charge after two seconds at 17% or lower relative humidity (column 3, lines 23–26). The carbon black paper used in the laminate exemplified in this patent contains a non-uniform dispersion of carbon particles which, in the finished laminate, tend to enhance the conductivity of that layer. The carbon particles are extremely small, submicron in size. Thus, electrical continuity in the layer is dependent on high concentrations of carbon particles to achieve low resistances. Even then, the resistance is somewhat dependent on resin content because the greater the resin content, the more the resin coats each individual particle and insulates it from neighboring particles.

Moreover, the use of carbon black paper creates tremendous handling and control problems. The carbon black paper has a highly non-uniform distribution of carbon which creates widely varying electrical properties locally within the paper. Also, the wet tensile strength varies throughout a roll of such carbon black paper as a result of the uneven carbon distribution, often making it difficult to uniformly impregnate with resin.

Another disadvantage of the carbon black paper is that the yields using this carbon black paper have not been found to be optimal because of wastage, partly due to some of the aforementioned problems. There have also been found to be cross-contamination problems with the use of carbon black in decorative laminate processes.

SUMMARY OF THE INVENTION

It is, accordingly, an object of the invention to overcome the deficiencies and problems of the prior art, such as indicated above, and without loss of the advantages of the laminates of Ungar et al U.S. Pat. No. 4,784,908.

It is another object to provide for the safe and effective dissipation of static electricity from work surfaces.

Still another object is to provide an improved static dissipative and non-conductive laminate having a controlled and consistent internal resistance less than $2 \times 10^6$ ohms, and a resistance to ground measurement of about $5 \times 10^6$.

It is yet another object of the present invention to provide an improved static dissipative laminate having a reduced disparity between surface resistivity and lower layer resistivity, and therefore a static dissipative laminate in which there is no field suppression problem.

It is a further object of the invention to provide excellent static dissipative properties regardless of the relative humidity of the surrounding air.

It is yet a further object of the present invention to provide an attractive static dissipative laminate which looks like normal decorative high pressure laminate and has good heat resistance, water resistance and stain resistance, as well as excellent abrasion resistance.

It is a still further object of the present invention to provide a static control laminate having highly uniform electrical properties.

These objects are obtained by using one or more layers of a resin impregnated special carbon fiber paper directly below the decorative layer, the special carbon fiber paper containing only a very small amount of carbon. The carbon fiber paper replaces the carbon black filled paper of the prior art providing surprising results of improved properties including highly uniform electrical properties when considering the relatively minute amount of conductive fiber used.

BRIEF DESCRIPTION OF THE DRAWING

The sole figure is a schematic perspective view, partly in section, of a laminate in accordance with the present invention.

DETAILED DESCRIPTION OF EMBODIMENTS

The figure shows a static dissipative laminate 10 having a decor sheet 12 with an abrasion resistant upper face as its upper layer, one or more special carbon fiber containing core layers 14 therebeneath, and a plurality of regular core layers 16 therebeneath.

The decor sheet 12 may be conventional decor paper, e.g. solid colored or patterned such as by having a design printed on its upper surface in accordance with conventional practice. The decor sheet 12 is preferably consistent with that disclosed in the aforementioned Ungar et al U.S. Pat. No. 4,784,908 which is hereby incorporated by reference. To give the laminate 10 the desired abrasion resistance, the decor sheet 12 may have an ultra-thin abrasion resistant layer on its upper face consistent with the Scher et al U.S. Pat. No. 4,255,480 and its progeny, or the Ungar et al U.S. Pat. No. 4,713,138. To make the laminate scuff resistant, the ultra-thin coating may be further modified to contain solid lubricant in accordance with O'Dell et al U.S. Pat. No. 4,567,087.

As noted above, the abrasion resistant decor layer 12 of the static dissipative laminate 10 of the present invention is desirably prepared according to the '908 patent, and is preferably a decorative paper sheet impregnated with melamine resin containing an humectant such as glycerin and an ionic salt such as sodium formate in the proportions set forth in that patent.

One or more special core layers 14 of carbon fiber containing paper are preferably utilized directly below the decorative layer 12 of the laminate 10. In the finished layer carbon makes up approximately 1% or less of the weight of the layer in the form of randomly and irregularly distributed carbon fibers. The preferred range is approximately from 0.6 to 1.0% by weight carbon based on the total ply weight including impregnant. The preferred average and ideal carbon content is approximately 0.8% by weight based on total ply weight. It has been found that the lower value of carbon content of about 0.6% by weight is critical in the sense that at a value below the critical value, which is 0.6% based on the total impregnated ply weight or very close thereto depending on the exact amount of resin and other additives present, the ability of the laminate to effectively dissipate static electricity will be lost.

The special carbon fiber conductive core paper is made by conventional paper making techniques using small quantities of the carbon fibers along with the usual paper making fibers. The carbon fibers are originally preferably about 0.25 inches in length, although at least some of them usually become broken during the manufacture of the paper. If the fibers are substantially longer, e.g. 0.5 inches in length, they tend to undesirably clump during the paper making process; if the carbon fibers are substantially shorter, e.g. 0.15 inches, substantially greater quantities of these very expensive fibers are required and also the laminate will become undesirably stiffer. The carbon fibers preferably comprise approximately 0.9–1.5% by weight of the total fibers of the paper sheet. Use of greater than 1.9% carbon fiber make the paper undesirably stiff and the resultant laminate more difficult to postform.

This special core paper 14 is impregnated, as is the conventional core paper 16 therebeneath, with phenolic resin or the like in the usual way. The phenolic resin may be either treated by the addition of ionic salt and/or humectant as per Ungar et al '908, or untreated; preferably the phenolic resin used in the special core paper is untreated whereas that used in the regular core paper is treated. As noted above, the carbon fibers comprise only 0.6 to 1.0% of the total weight of the core layers 14 in the completed laminate 10.

No overlay or any special bottom layer is necessary. The core layers (special layers 14 and regular layers 16) do not require the presence of humectant or ionic salt.

Because of the very small quantity of carbon which is present in the carbon fiber core paper used in accordance with the present invention, such a special carbon fiber core paper is not black like the carbon filled black core paper of the prior art, and therefore (unlike the carbon black core paper of the prior art) it can be placed directly below the decorative layer without impairing the visual effects of the final laminate. Indeed, this special carbon fiber core paper can be white by the use of bleached pulp or colored, e.g. gray or light brown, such as by the use of dyes and/or pigments to enhance the appearance of the final laminate. Moving the conductive core layer up to a location directly below the decor layer eliminates the need for any special treatment of the phenolic resin in any other layers, e.g. the use of ionic salt and/or humectant, even though such special treatment may be desirable for other reasons.

The following examples will illustrate the manner in which the invention can be practiced, it being understood that these examples are not to be considered limiting of the invention:

SERIES I EXAMPLES

A series of examples are run similar to Examples 3–5 of the Ungar et al U.S. Pat. No. 4,784,908, except that the core layers containing carbon as used in said Ungar et al U.S. patent '908 are eliminated along with the optional top core layer, and these are replaced by a series of conventional core layers topped with a special carbon fiber core paper comprising 0.95% by weight carbon fibers based on the total fiber weight. In some of the laminate lay-ups, conventional phenolic resin is used without ionic salt, and in other lay-ups the phenolic resin used is consistent with example 4 of said Ungar et al U.S. Patent '908. The laminates are pressed under conventional conditions, and the resultant static dissipative laminates are found to have excellent properties consistent with the requirements of the present invention.

SERIES II EXAMPLES

Additional static dissipative laminates are made similar to those of Example 6 of the Ungar et al U.S. patent '908, but with the same modifications set forth in the Series I examples above, the special core paper forming the layer 14 being brown paper. The resultant laminates consistently have an internal resistance less than $2 \times 10^6$ ohms and a resistance to ground measurement of about $5 \times 10^6$ and less than $5 \times 10^7$, a surprising result in view of the relatively minute amount of carbon fiber present in the brown core paper 14.

The foregoing description of the specific embodiments will so fully reveal the general nature of the invention that others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed is:

1. In a decorative, static dissipative, non-conductive high pressure laminate of the type having a plurality of consolidated thermosetting resin impregnated layers including a core and a carbon fiber-free decor surface layer containing an amount sufficient of an ionic salt and of an humectant to provide a surface resistance no greater than about $2 \times 10^9$, the improvement wherein:
   said core comprises at least one thermoset resin impregnated paper core sheet substantially free of carbon and at least one special thermoset resin impregnated core sheet of predominantly paper fibers and about 0.9% to 1.9%, based on the total fiber weight of said special core sheet, of carbon fibers of length less than about 0.5 inches randomly distributed among said paper fibers, said carbon fibers being present in an amount of at least 0.6% based on the total weight of said special core sheet.

2. The laminate of claim 1 wherein said carbon fibers are approximately 0.25 inches in length prior to manufacture of said special core sheet.

3. The laminate of claim 1 wherein carbon fibers comprise approximately 0.8% of the weight of said special core sheet.

4. The laminate of claim 1 wherein said ionic salt is sodium formate and said humectant is glycerin.

5. The laminate of claim 1 wherein said core is substantially free of ionic salt and humectant.

6. The laminate of claim 1 wherein said core contains at least one of an ionic salt and an humectant, and said special core sheet is substantially free of ionic salt and humectant.

7. The laminate of claim 1 wherein said special core sheet has a color other than black.

8. A laminate according to claim 1 wherein a majority of said carbon fibers have a length of about 0.15 inches to 0.5 inches.

9. A laminate according to claim 1 wherein said special thermoset resin impregnated core layer comprises approximately 0.95% by weight carbon fibers based on the total fiber weight.

10. In a static dissipative, non-conductive high pressure laminate comprising a plurality of consolidated layers having effectively zero volt charge after two seconds at 17% or lower relative humidity; and a substantially carbon-free decor layer above said core layers, said decor layer being impregnated with a thermoset resin and an amount sufficient of glycerin or an aliphatic tertiary amine together with an ionic salt to provide a surface resistance no greater than about $2 \times 10^9$, the improvement wherein:
    said core comprises at least one conductive core layer substantially free of carbon and a special core layer comprising about 0.9% to 1.9%, based on the total fiber weight of said special core layer, of carbon fibers of length less than about 0.5 inches randomly distributed therein, said carbon fibers being present in an amount of at least 0.6% based on the total weight of said special core layer, said laminate having an internal resistance less than $2 \times 10^6$ ohms and a resistance to ground measurement of about $5 \times 10^6$.

11. A laminate according to claim 10 wherein a majority of said carbon fibers have a length of about 0.15 inches to 0.5 inches.

12. A laminate according to claim 10 wherein said special thermoset resin impregnated core layer comprises approximately 0.95% by weight carbon fibers based on the total fiber weight.

13. In a decorative, static dissipative, non-conductive high pressure laminate of the type having a plurality of consolidated thermoset resin impregnated layers including a core and a conventional carbon fiber-free decor surface layer containing an amount sufficient of an ionic salt and of an humectant to provide a surface resistance no greater than about $2 \times 10^{10}$, the improvement wherein:
    said core comprises at least one thermoset resin impregnated paper core sheet substantially free of carbon and a single special thermoset resin impregnated core layer of paper fibers and about 0.9% to 1.9%, based on the total fiber weight of said special core layer, of carbon fibers of length less than about 0.5 inches randomly distributed among said paper fibers, said carbon fibers being present in an amount of at least 0.6% based on the total weight of said special core layer.

14. A laminate according to claim 13 wherein a majority of said carbon fibers have a length of about 0.15 inches to 0.5 inches.

15. A laminate according to claim 14 wherein said single special thermoset resin impregnated core layer comprises approximately 0.95% by weight carbon fibers based on the total fiber weight.

* * * * *